(12) United States Patent
Chang et al.

(10) Patent No.: US 12,028,127 B2
(45) Date of Patent: Jul. 2, 2024

(54) ENHANCED EDGE DETECT POWER LINE COMMUNICATION

(71) Applicant: Google LLC, Mountain View, CA (US)

(72) Inventors: Yuan Jen Chang, Roc (TW); Shih-Hsien Yang, Tapei (TW)

(73) Assignee: Google LLC, Mountain View, CA (US)

( * ) Notice: Subject to any disclaimer, the term of this patent is extended or adjusted under 35 U.S.C. 154(b) by 511 days.

(21) Appl. No.: 17/296,420

(22) PCT Filed: Jun. 29, 2020

(86) PCT No.: PCT/US2020/040112
§ 371 (c)(1),
(2) Date: May 24, 2021

(87) PCT Pub. No.: WO2022/005449
PCT Pub. Date: Jan. 6, 2022

(65) Prior Publication Data
US 2022/0173768 A1 Jun. 2, 2022

(51) Int. Cl.
*H04B 3/54* (2006.01)
*H04B 3/56* (2006.01)

(52) U.S. Cl.
CPC ............ *H04B 3/548* (2013.01); *H04B 3/54* (2013.01); *H04B 3/56* (2013.01);
(Continued)

(58) Field of Classification Search
CPC .................. H04B 3/54; H04B 2203/54; H04B 2203/5404; H04B 2203/5462
See application file for complete search history.

(56) References Cited

U.S. PATENT DOCUMENTS

2007/0091516 A1* 4/2007 Takano ................. H04B 3/548
361/18
2008/0267301 A1* 10/2008 Alfano ............... H04L 25/0268
375/258
(Continued)

FOREIGN PATENT DOCUMENTS

CN 1992560 7/2007
CN 102374610 3/2012
(Continued)

OTHER PUBLICATIONS

International Search Report and Written Opinion for International Application No. PCT/US2020/040112 dated Dec. 8, 2020. 12 pages.
(Continued)

*Primary Examiner* — Benyam Haile
(74) *Attorney, Agent, or Firm* — Colby Nipper PLLC

(57) ABSTRACT

The technology provides for a power line communication system capable of providing data from a first device to a second device over a power line. The first device may include a set of contacts and a second device may include a second set of contacts. The second set of contacts may be adapted to electronically engage with the first set of contacts of the first device to form at least a power and ground lines connection. Circuitry within the first device and the second device may include circuitry for providing data over the power line connection between the first device and the second device. The circuitry may comprise a power line, a ground line, a transmitter line carrying data signals, a capacitor coupling the transmitter line to the power line at a connection point, and a receiver comprising two field effect transistors.

20 Claims, 8 Drawing Sheets

(52) U.S. Cl.
CPC .. *H04B 2203/545* (2013.01); *H04B 2203/547* (2013.01); *H04B 2203/5491* (2013.01)

(56) References Cited

U.S. PATENT DOCUMENTS

| | | | |
|---|---|---|---|
| 2009/0116676 | A1 | 5/2009 | Welsh et al. |
| 2012/0177133 | A1* | 7/2012 | Oldenkamp ............ H04B 3/54 375/257 |
| 2013/0328528 | A1 | 12/2013 | Takata et al. |
| 2014/0307759 | A1 | 10/2014 | Sundar et al. |
| 2015/0200654 | A1 | 7/2015 | Kawahara |
| 2016/0141910 | A1 | 5/2016 | Klawon et al. |
| 2017/0245040 | A1* | 8/2017 | Hankey ................ H02J 7/0042 |
| 2020/0007190 | A1 | 1/2020 | Ding et al. |
| 2020/0014424 | A1* | 1/2020 | Yano ........................ H04B 3/54 |
| 2020/0313723 | A1* | 10/2020 | Vining ................ G06F 13/4282 |

FOREIGN PATENT DOCUMENTS

| | | |
|---|---|---|
| CN | 103339821 | 10/2013 |
| CN | 103959666 | 7/2014 |
| CN | 104113347 | 10/2014 |
| EP | 1780903 A1 | 5/2007 |
| EP | 2416080 A2 | 2/2012 |

OTHER PUBLICATIONS

"Extended European Search Report", EP Application No. 22207234.0, dated Jan. 30, 2023, 8 pages.

"International Preliminary Report on Patentability", Application No. PCT/US2020/040112, dated Dec. 13, 2022, 7 pages.

"Foreign Office Action", CN Application No. 202080006644.5, dated Oct. 20, 2023, 20 pages.

* cited by examiner

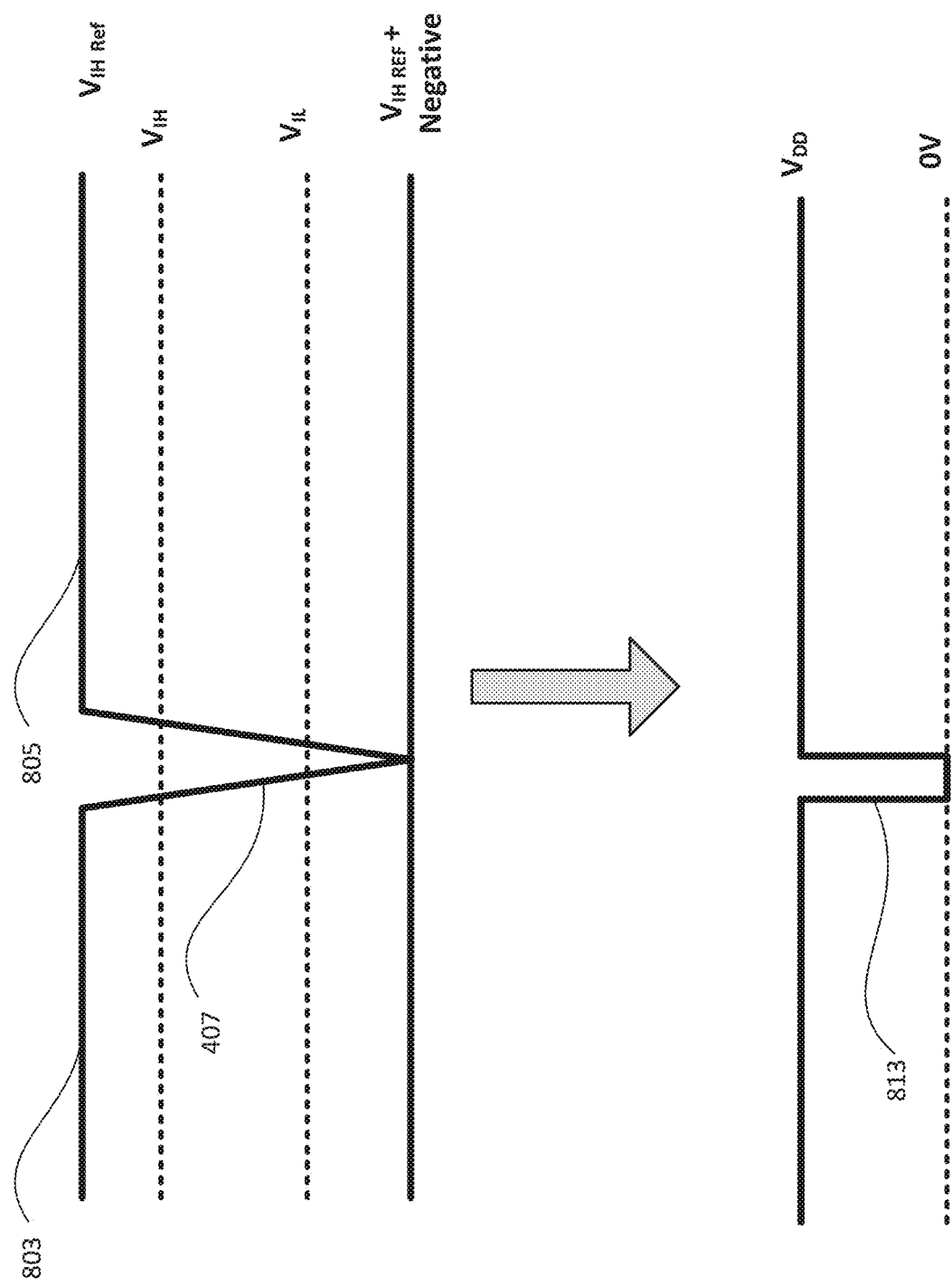

ENHANCED EDGE DETECT POWER LINE COMMUNICATION

CROSS-REFERENCE TO RELATED APPLICATION

This application is a national phase entry under 35 U.S.C. § 371 of International Application No.: PCT/US2020/040112, filed on Jun. 29, 2020, the entire disclosure of which is incorporated herein by reference.

BACKGROUND

When transferring signals between two electronic devices, it is preferable to minimize the number of contacts between the devices. For example, reducing the number of pins on charging/data cables for mobile devices, as well as a number of contacts in the mobile devices, helps to provide more room for other technology in the mobile device. This is particularly true for small form factor devices, such as smartwatches, earbuds, Bluetooth headsets, head-mounted displays, etc. Moreover, an increased number of contacts increases the possibility of error and reduces reliability. For example, an increased number of contacts results in an increased probability that one of the contacts will become damaged or worn out or otherwise defective. Additionally, each contact included in a device increases the costs of production of the device. However, because various types of signals typically need to be transmitted, such as power signals, data signals, control signals, etc., reducing the number of contacts can be quite challenging.

In some devices, data signals can be transmitted over power lines to reduce the number of contacts required. These devices may use modulation systems that use modulation techniques such as on-off keying (OOK), amplitude shift keying (ASK), frequency-shift keying (FSK), phase-shift keying (PSK), etc. Each of these modulation techniques uses a high-frequency carrier to carry a data signal across the power line. These modulation systems typically have high propagation delays due to the need for modulation and demodulation modules. The modulation and demodulation modules also add cost and complexity to the production of the devices. Additionally, the high-frequency carrier used to carry the data signal across the power line may introduce electromagnetic interference that may adversely affect other components of the device.

Other devices may use time-division multiplexing or other non-modulated communication systems to transmit data signals over power lines. In time-division multiplexing systems, power and data may be transmitted at different times across the same power line. Time-division multiplexing systems may include detection mechanisms and communication systems to ensure that a receiving device has sufficient battery capacity reserved since power cannot be delivered when data is transmitting. Moreover, time-division multiplexing detection mechanisms and communication systems may add cost and complexity to the production of the device. Other communication systems, such as those which use operational amplifiers as comparators, may be limited by open-loop gain bandwidth and propagation delays, thereby making them unable to meet the data throughput demands of modern devices.

SUMMARY

One aspect of the disclosure provides a system comprising a first device including a first set of contacts; a second device including a second set of contacts, the second set of contacts adapted to electronically engage with the first set of contacts of the first device to form at least a power and ground lines connection; each of the first device and the second device including circuitry for providing data over the power line connection between the first device and the second device, the circuitry comprising: a power line; a ground line; a transmitter line carrying data signals; a capacitor coupling the transmitter line to the power line at a connection point, the capacitor configured to filter DC components from the data signals and output a filtered signal that is carried to the power line; a receiver comprising two field-effect transistors, the two field-effect transistors configured to detect the filtered signal. In some embodiments, the first device is a case and the second device is an earbud.

In some examples, the data signals include one or more square waves. The filtered signal may, for each of the one or more square waves, include a positive pulse and a negative pulse.

In some embodiments, a first of the two field-effect transistors is connected to the power line via a first reception line and a second of the two field-effect transistors is connected to the power line via a second reception line.

In some examples, a second capacitor couples the first reception line and the first field-effect transistor and a third capacitor couples the second reception line and the second field-effect transistor.

In some embodiments, the first field-effect transistor is configured to detect positive pulses of the filtered signal and the second field-effect transistor is configured to detect negative pulses of the filtered signal.

In some instances, the system includes a low reference voltage source and a high reference voltage source. The low reference voltage source may be connected to the first reception line and the high reference voltage source may be connected to the second reception line.

In some examples, the first field-effect transistor has a low detection voltage and the first field-effect transistor is configured to detect the filtered signal when the voltage of the filtered is at or above the low detection voltage. In some embodiments, wherein the second field-effect transistor has a high detection voltage and the second field-effect transistor is configured to detect the filtered signal when the voltage of the filtered is at or below the high detection voltage. The system may further include a latch for reconstructing the detected filtered signal.

Another aspect of the disclosure is directed to a transmitting device including circuitry for providing data over a power line connection to another device, the transmitting device comprising: a power line extending from a power supply at the source device; a transmitter line coupled to the power line; a capacitor coupling the transmitter line to the power line at a coupling point; and a power source.

In some examples, the transmitting device includes an LC filter is positioned between coupling point and the power source.

In some examples, the transmitter line is configured to carry data signals, received from a transmitter, to the power line.

In some embodiments, the capacitor filters the data signals.

Another aspect of the disclosure is directed to a receiving device, comprising: a power line; a receiver comprising: a first field effect transistor; a second field effect transistor; and a latch; a first capacitor for coupling the power line to the first field effect transistor; and a second capacitor for coupling the power line to the second field effect transistor, wherein the device is configured to receive power and data from another device over the power line.

In some examples, the receiving device is further configured to transmit data over the power line to the other device.

In some embodiments, a power source may be connected to the power line.

BRIEF DESCRIPTION OF THE DRAWINGS

FIG. 8 is an illustration of a negative pulse detection in accordance with aspects of the disclosure.

DETAILED DESCRIPTION

Overview

Figure 1:
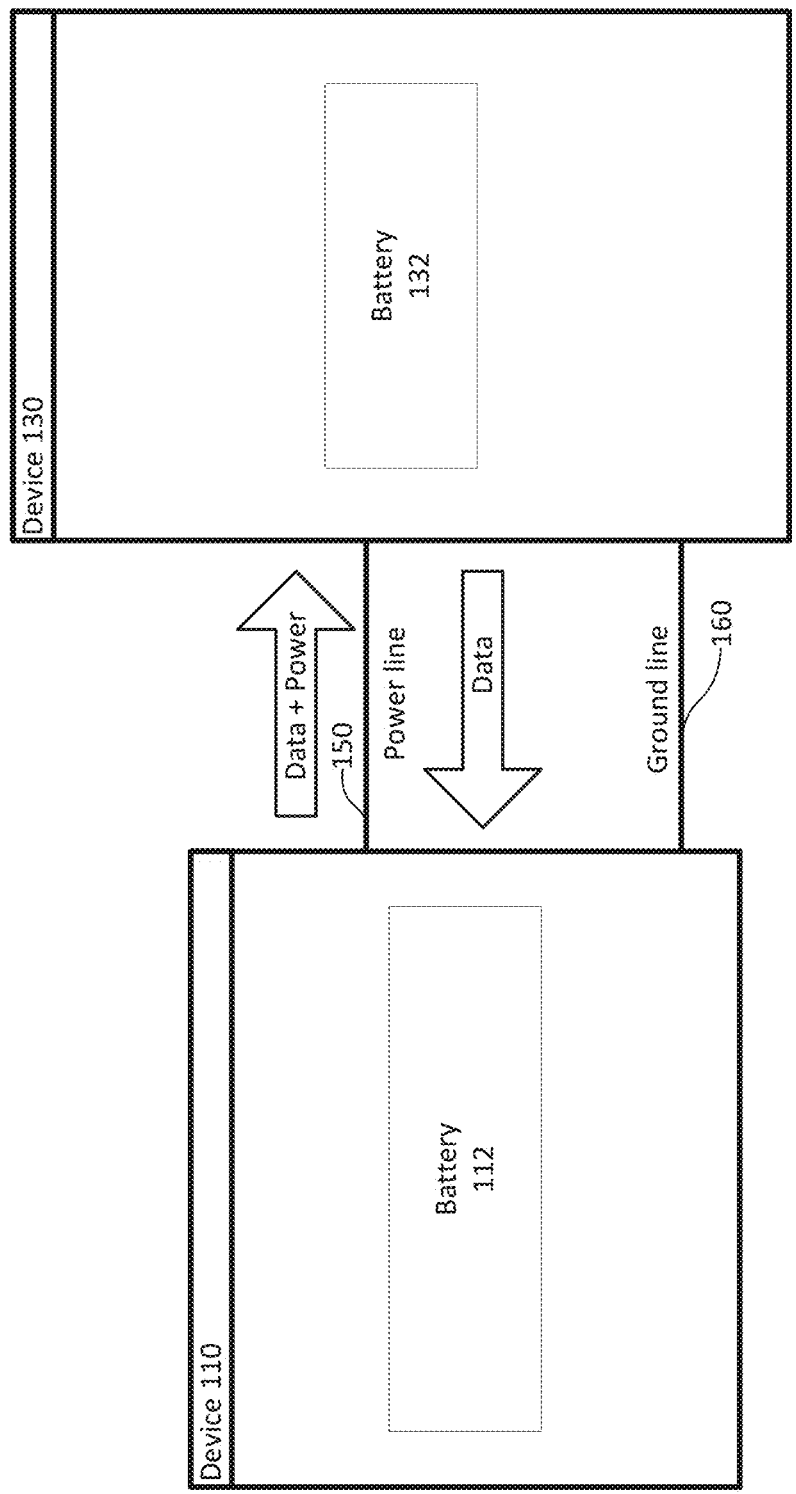
FIG. 1 is a functional block diagram illustrating an example system according to aspects of the disclosure.

The technology relates generally to a circuit design enabling transmission of data over power lines, commonly referred to as power line communication (PLC). Such circuitry may be implemented in any of a number of devices where one device provides power to another device. For example, wireless accessories for mobile devices, such as a pair of wireless earbuds, may receive power from a case. According to this disclosure, the circuitry within the case for the earbuds may enable transmission of data from the case to the earbuds through a power line used to charge the earbuds. In this regard, only two contacts are needed between the case and the earbuds: one contact for a power line over which data and power are transmitted and received, and one contact for ground.

The circuit design includes a power line interface and a ground interface between a power source device (PSD) and a power receiving device (PRD). The interface may be, for example, a line interface, a bus, or any other types of interface adapted to deliver power from the PSD to the PRD. Each of the PSD and PRD may include a power source for providing power on the power line.

A transmitter may be coupled to the power line via a transmission line. A capacitor may be positioned on the transmission line and may be used to capacitively couple the transmitter to the power line. The capacitor may block DC signals sent from the transmitter on the transmission line, but allow AC signals to pass through to the power line.

The data signals output by the transmitter may be square waves. When passed through the capacitor, the DC components of the square wave may be filtered resulting in a positive pulse associated with a leading edge of the square wave and a negative pulse associated with the trailing edge of the square wave being transmitted on the power line.

The PRD may include a receiver connected to the power line via two reception lines. Each reception line may be connected to a field-effect transistor (FET) or a channel of a multi-channel FET that operate as edge detectors for detecting the pulses associated with each edge of the data signal. One of the FETs, or one of the channels of the multi-channel FET, may be configured to detect the positive pulse. The other FET or another channel of the multi-channel FET may be configured to detect the negative pulse. In some instances, BJTs or other such transistors may be used in place of the FETs.

A latch in the receiver may receive the detection signals from the FETs and reconstruct the data signal from the detected signals for output for further processing by components of the PRD.

In some examples, identical circuits may be placed in both the PSD and the PRD. For example, for a wireless earbud and a case, the case may provide power and data over the power line to the earbud, and the earbud may also provide power and data over the power line to the case. By transmitting the data over the power line, a minimal number of device contacts may be used, thereby providing for efficiency in manufacture, better reliability, and ease of use.

Example Systems

FIG. 1 illustrates an example of a first electronic device 110 which supplies power to a second electronic device 130. For example, the first electronic device 110 includes a power source, such as a battery 112, which can supply a charge to battery 132 of the second electronic device 130. The first and second electronic devices 110, 130 may be electronically coupled, for example, via power line 150 and ground line 160. While the power and ground lines 150, 160 are shown as respective lines between the two devices, it should be understood that each of the first and second electronic devices 110, 130 may include its own power line and ground line, terminating in contacts, and that the electronic coupling of the two devices may be formed when the contacts on the first electronic device 110 meet the contacts of the second electronic device 130. In some instances, first electronic device 110 may receive power from another device, such as a wireless charger or USB-C charger and pass this power through to the second device. In this regard, the first electronic device may not include a battery.

The charge from the first device 110 to the second device 130 may be supplied through the power line 150. While the power is shown as being transmitted in one direction, in other examples the power may be supplied from either device to the other, for example, depending on user input or detected conditions. As shown in FIG. 1, data may also be supplied from the first electronic device 110 to the second electronic device 130, and from the second electronic device 130 to the first electronic device 110, over the power line 150. The data may include any kind of information, such as battery levels, media playback information, software updates, firmware updates, etc. In some examples, the transmission of data over the power line 150 may be disabled, separately from the transmission of power.

Figure 2:
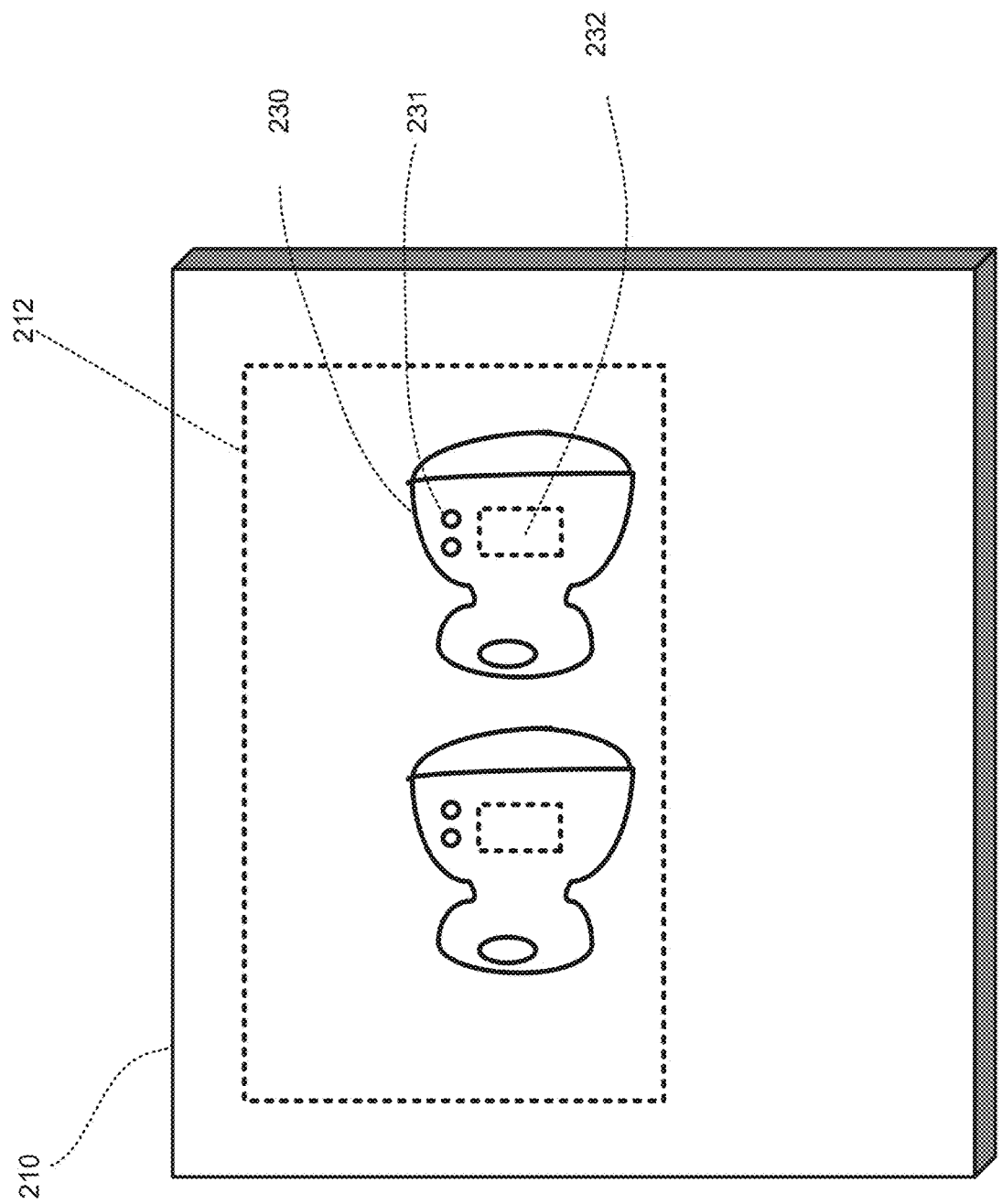
FIG. 2 is an example pictorial diagram of the system of FIG. 1.

FIG. 2 provides a pictorial diagram illustrating an example of the devices of FIG. 1. As shown in this example, the first electronic device is a case 210 and the second electronic device is a pair of earbuds 230. The earbuds 230 may be wireless in that they do not require a wired connection to a music player, phone, or other devices to be powered. The earbuds 230 include one or more batteries 232 which provide power to the earbuds 230 and other components therein, such as transmitters, receivers, amplifiers, etc. The batteries 232 of the earbuds 230 may be relatively small, in view of the small size of the earbuds 230. The case 210 in which the earbuds 230 are shipped and stored may have a larger battery 212. This larger battery 212 of the case 210 may deliver a charge to the smaller batteries 232 of the earbuds 230.

When the earbuds 230 are placed inside the case 210 in a given orientation, contacts 231 on the earbuds 230 may come into contact with contacts (not shown) on the case 210 to establish an electrical connection, including a power line connection and a ground line connection. Contacts may include pogo pins or any other such connector capable of being connected and disconnected. In some examples, each earbud may operate independently, and thus power and ground line connections are established with a first earbud, while separate power and ground line connections are established with a second earbud. Accordingly, the case 210 may supply power to the earbuds 230, as well as supplying data to the earbuds 230 over the power line. The earbuds 230 may also provide data over the power line to the case 210. In some instances, the earbuds 230 may provide power to the case 210.

While the example of FIG. 2 illustrates the first electronic device as a case and the second electronic device as a pair of earbuds, it should be understood that the transfer of data over a power line may be implemented in any of a variety of devices. By way of example only, the electronic devices may include any of a phone, phone accessories, smartwatch, toys, gaming systems and controllers, input devices such as a mouse, keyboard, joystick, touchpad, etc., tablets, etc.

Figure 3:
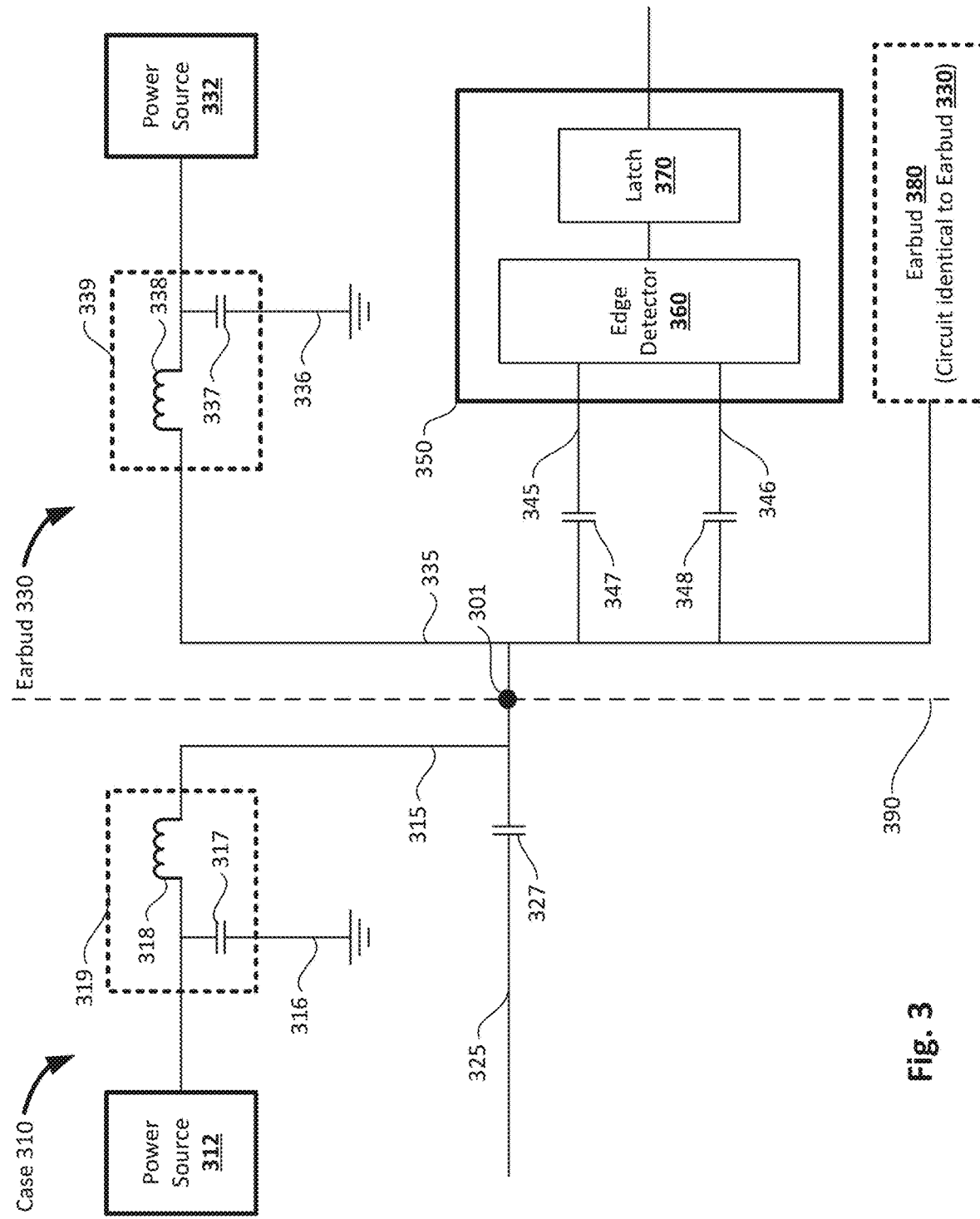
FIG. 3 is an example circuit diagram of the system of FIG. 1.

FIG. 3 provides a circuit diagram illustrating a circuit design of the first electronic device (PSD) and the second electronic device (PRD). While in this example the first device 310 shown to the left of dividing line 390 is labeled as a case and the second device 330 to the right of dividing line 390 is labeled as an earbud, as mentioned above the first and second devices may be any of a variety of types of devices. In this example, first earbud (second device 330) and second earbud 380 are attached to the same power line from the case (first device 310). Although not shown, the case 310 and earbuds 330, 380 may also be connected via a ground line. The earbuds 330, 380 are shown sharing the same pair of physical lines. Other designs are possible, such as two power lines coming out of the case 310, each bus connecting to a specific earbud via a power line and ground line. Because in this example the internal components of a second earbud 380 are identical to the first earbud (second device 330), only the circuitry of the first earbud is shown for simplicity.

The first device 310 includes a power source 312, such as a DC power source. Although not shown, the DC power source may include, or otherwise be connected to a switch-mode power supply (SMPS) regulator. The power source may output power on a power line 315 extending therefrom. If present, the power may pass through the SMPS regulator. The first device 310 further includes a ground with ground line 316 which is capacitively coupled to the power line 315 by capacitor 317. An inductor 318 is inserted into the power line 315 after the ground line 316. The capacitor 317 and inductor 318 may function as an LC filter, shown in the dashed box 319, to reduce power noise coupling to the SMPS regulator. Although the foregoing example illustrates an LC filter, an RC filter or other such filter capable of reducing high frequency noise may be used in place of the LC filter or in conjunction with the LC filter.

The second device 330 includes its power circuitry which corresponds to that of the first device 310. For example, the second device 330 includes a power source 332, such as a battery. Like in the first device 310, the power source 332 may include, or otherwise be connected to, a switch-mode power supply (SMPS) regulator. The power source may output power on a power line 335 extending therefrom. If present, the power may pass through the SMPS regulator. The second device 330 further includes a ground with ground line 336 which is capacitively coupled to the power line 335 by capacitor 337. An inductor 338 is inserted into the power line 335 after the ground line 336. The capacitor 337 and inductor 338 may function as an LC filter, shown in the dashed box 339, to reduce power noise coupling to the SMPS regulator. Although the foregoing example illustrates an LC filter, an RC filter or other such filter capable of reducing high frequency noise may be used in place of the LC filter or in conjunction with the LC filter.

A connection between the power line 315 of the first device 310 may be made with the power line 335 of the second device 330. For example, and as shown in FIG. 3, a connection between power line 315 and power line 335 is made at point 301. Point 301 may be formed at the position where a contact of the case 310 connects to a contact of the first device 330. Although not shown, the ground lines 316 and 336 may also be joined at a point corresponding to where another contact from the first device 310 connects with another contact from the second device 330. Additionally, separate connection points may be formed between the case 310 and earbud 380 to connect their respective power and ground lines.

The first device 310 may include a transmitter that may output signals on transmission line 325. Transmission line 325 may be capacitively coupled to the power line 315 via capacitor 327. The capacitor may be a multilayer ceramic capacitor (MLCC) having a value between or around 10 and 100 nF, although other values may be possible depending on the signals being transmitted.

Reception lines 345 and 346 in the second device 330 may capacitively couple a receiver 360 to power line 335. In this regard, a capacitor 347 may couple reception line 345 to the receiver 360 and capacitor 348 may couple reception line 346 to the receiver 360. The capacitors 347 and 348 may be MLCCs having a value somewhere between or around 10 and 100 nF, although other values may be possible depending on the signals and pulses being received.

The receiver 350 may include an edge detector 360 and latch 370. As described further herein, the edge detector 360 may be configured to detect filtered data signals sent over the power lines 315 and 335 and the latch may reconstruct the data signal from the detected filtered data signals. Although the latch 370 and edge detector 360 are shown as being included in the receiver 350, the receiver 350 may include only the edge detector 360 and the latch 370 may be positioned elsewhere in the second device 330.

Figure 4:
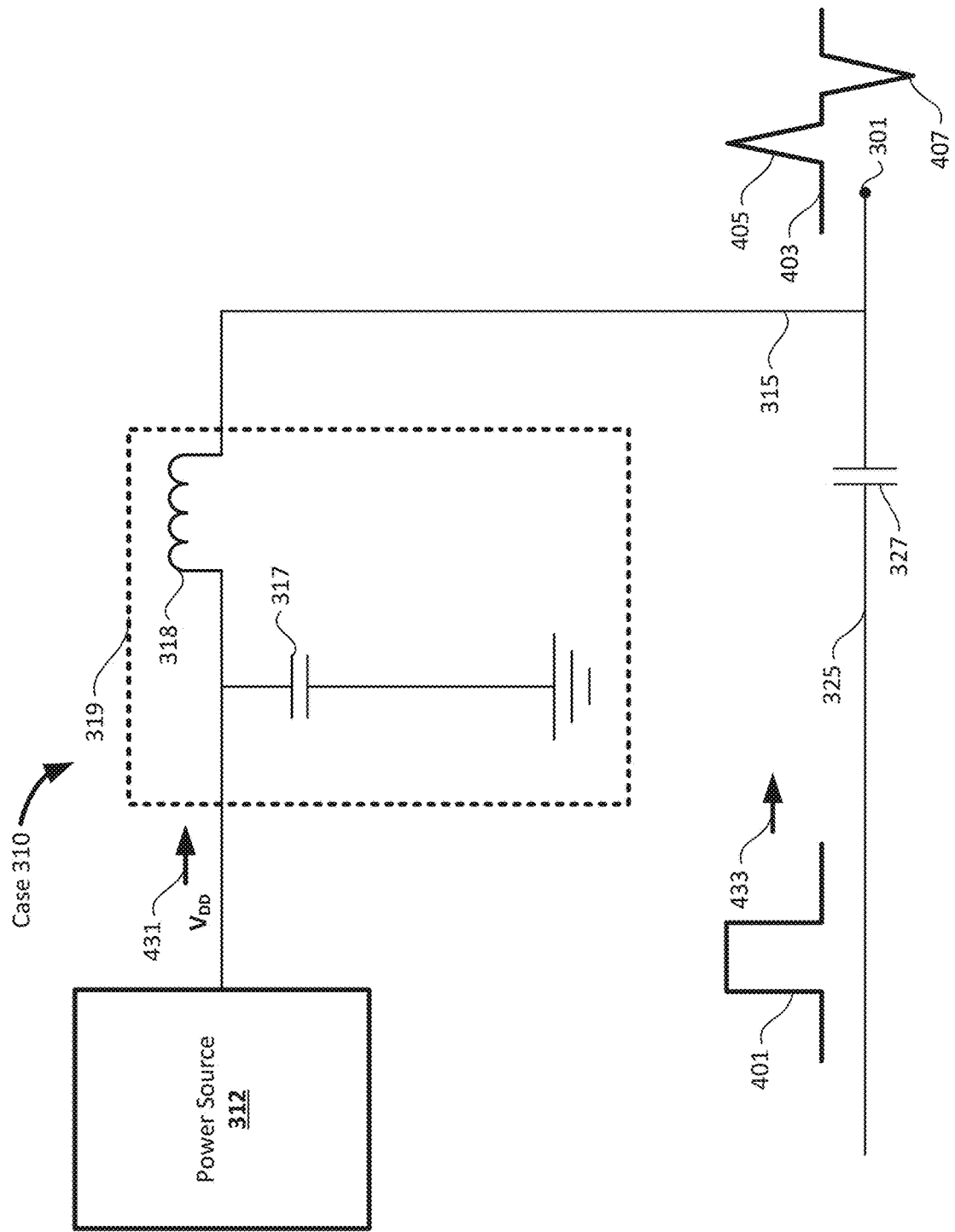
FIG. 4 is a detailed circuit diagram of a first device in accordance with aspects of the disclosure.

FIG. 4 shows the operation of the circuit of the first device 310. In this regard, the power source 312 may output power on power line 315 at a particular voltage, labeled $V_{DD}$, and current (not shown). $V_{DD}$ may be, by way of non-limiting example, 5 volts, although other voltages such as 2.77 volts, 12 volts, etc., may be output by the power source 312. The power may flow through the LC filter 319 formed from capacitor 317 and inductor 318, as shown by arrow 431. The capacitor may have a value around 10 μF and the inductor may have a value around 1 μH, although other values may be possible depending upon the noise level tolerance of the charger.

A data signal 401 may be sent by a transmitter (not shown) on transmission line 325. The data signal 401 may include one or more square waves, as further shown in FIG. 4. In some instances the value of the square wave may be between 0V and 5V, although other voltage ranges may be possible. The data signal 401 may travel through capacitor 327 which couples the transmission line 325 to the power line 315. As the data signal 401 passes through the capacitor, each square wave is converted into a filtered signal 403 having corresponding positive and negative pulses. In this regard, the filter signal 403 includes a positive pulse 405 corresponding to the rising edge of the square wave and a negative pulse 407 corresponding to the training edge of the square wave. When the data signal 401 is passed through the capacitor 327, a voltage swing of around 1V-10V may be introduced. To account for this voltage swing, the capacitor 327 may have a rating higher than 10V.

Figure 5:
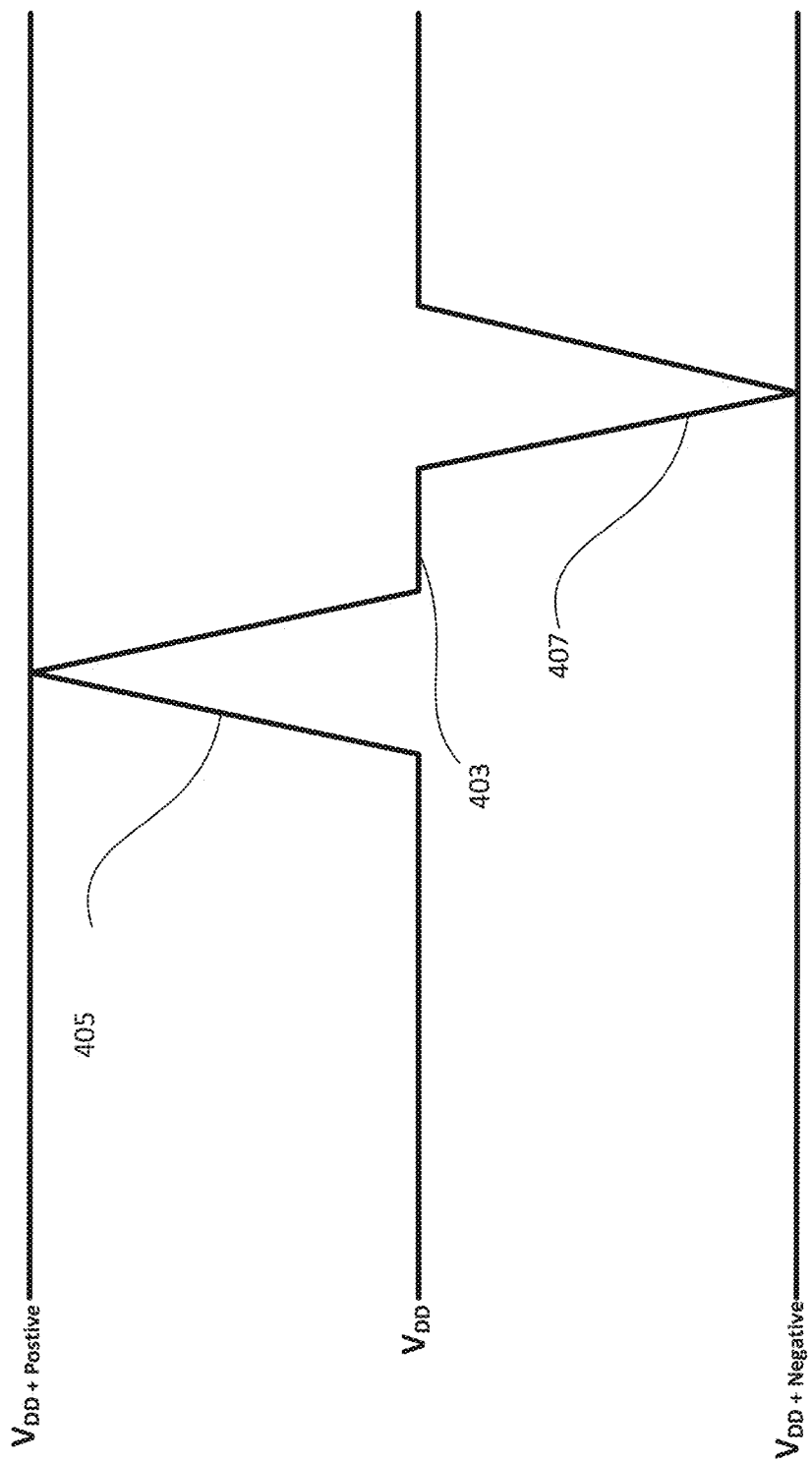
FIG. 5 is an example illustration of a filtered signal in accordance with aspects of the disclosure.

Referring to FIG. 5, the voltage on the power line 315 may be altered by each pulse, positive and negative, introduced by a filtered data signal. For example, prior to data signal 401 being transmitted on the transmission line 325, the voltage may be $V_{dd}$ on the power line 315. When the data signal 401 is transmitted and filtered, the first pulse 405 of the filtered data signal 403 may raise the voltage on the power line 315 to $V_{dd}$ plus the voltage of the positive pulse 405, as illustrated by the $V_{DD+Positive}$ line of FIG. 5. Similarly, the negative pulse may subsequently pull the voltage of the power line 315 down to $V_{dd}$ minus the voltage of the negative pulse 407, as illustrated by the $V_{DD+Negative}$ line of FIG. 5. Although FIGS. 4 and 5 illustrate a data signal 403 with only a single square wave, any number of square waves may be included in a data signal and any number of data signals may be transmitted.

Figure 6:
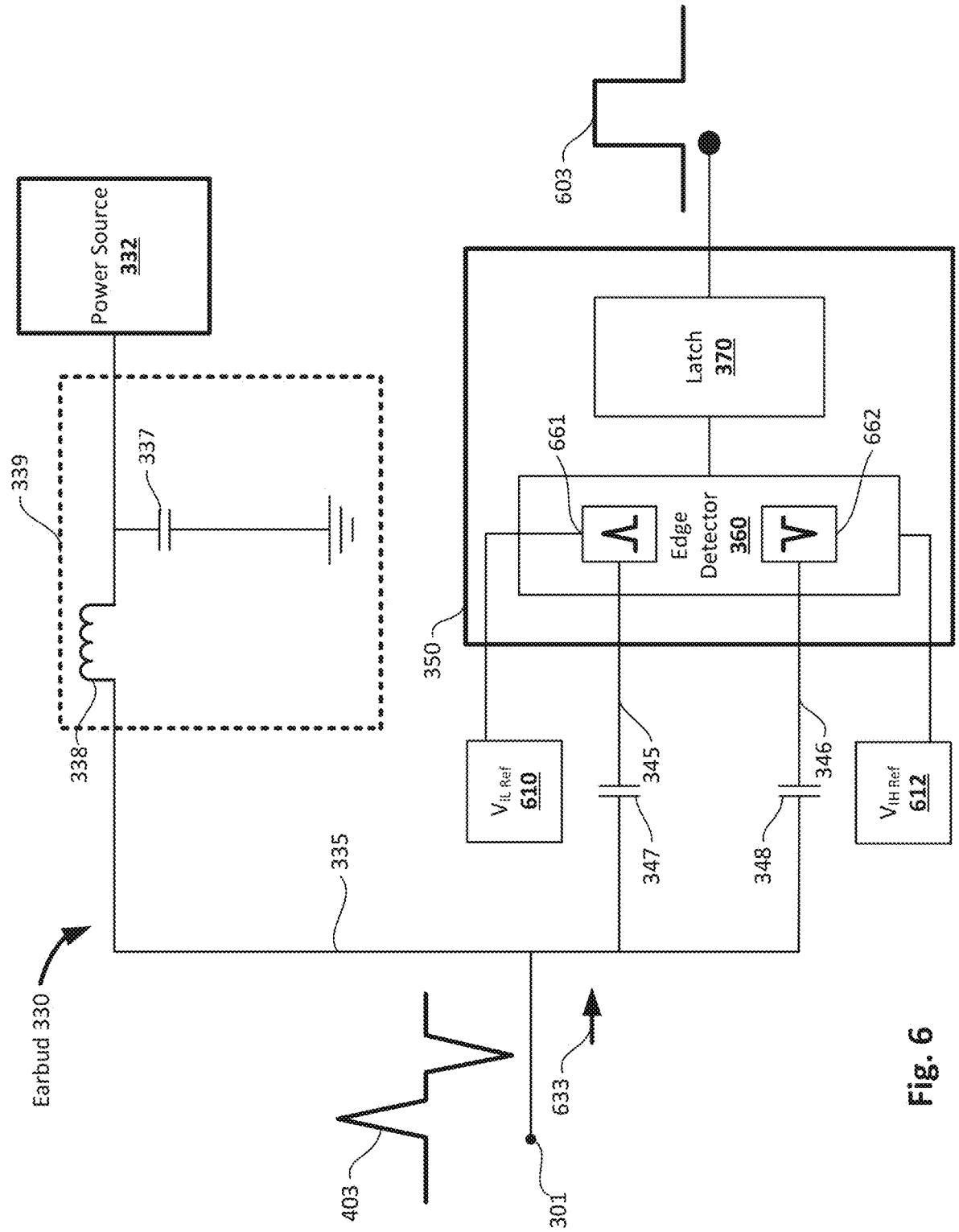
FIG. 6 is a detailed circuit diagram of a second device in accordance with aspects of the disclosure.

FIG. 6 illustrates the operation of the circuit of the second device 330. Filtered signal 403, along with power from the power source 312, may travel on power line 335 after being received through connection point 301. The power from power source 312 may be used to charge the power source 332. The filtered signal 403 may be fed into field-effect transistors (FET) 661 and 662 within edge detector 360 of the receiver 350. In this regard, the filtered signal 403 may pass through capacitor 347 to reception line 345 which connects to FET 661. Similarly, the filtered signal 403 may pass through capacitor 348 to reception line 346 which connects to FET 662. Although FIG. 6 illustrates the edge detector as having two discrete FETs, a multi-channel FET may be used instead, as described herein. The LC filter 339 may be a low pass filter that helps reduce the power noise and may reduce the power needed to filter the noise relative to a similar RC filter.

The FETs 661 and 662 may each be configured to detect a respective one of the pulses of the data signal. To enable detection, reference voltages may be added to the FETs 661 and 662. For example, a reference voltage $V_{IL\ Ref}$ may be provided to FET 661 and reference voltage $V_{IH\ Ref}$ may be provided to FET 662. These reference voltages may be provided to the gate side of the FETs. By applying the reference voltages on the FETs' gates, the FETs may be maintained in either an on or off state until a strong enough pulse arrives that can flip the FETs into the other state. $V_{IL\ Ref}$ and $V_{IH\ Ref}$ may be provided by discrete power sources and/or power source 332. In this regard, voltage dividers may be used to convert power from power source 332 to $V_{IL\ Ref}$ and $V_{IH\ Ref}$. Alternatively, additional batteries or other such power sources may be included in the second device 330 for supply one or more of $V_{IL\ Ref}$ and $V_{IH\ Ref}$.

The capacitors coupling the reception lines 345, 346 to the power lines 335 may block DC voltage. In this regard, the DC voltage present on 335 may be blocked from passing to the reception lines by the capacitors 347, 348. Accordingly, the voltage on reception lines 345 and 346 may only be present when filtered signals are sent.

Figure 7:
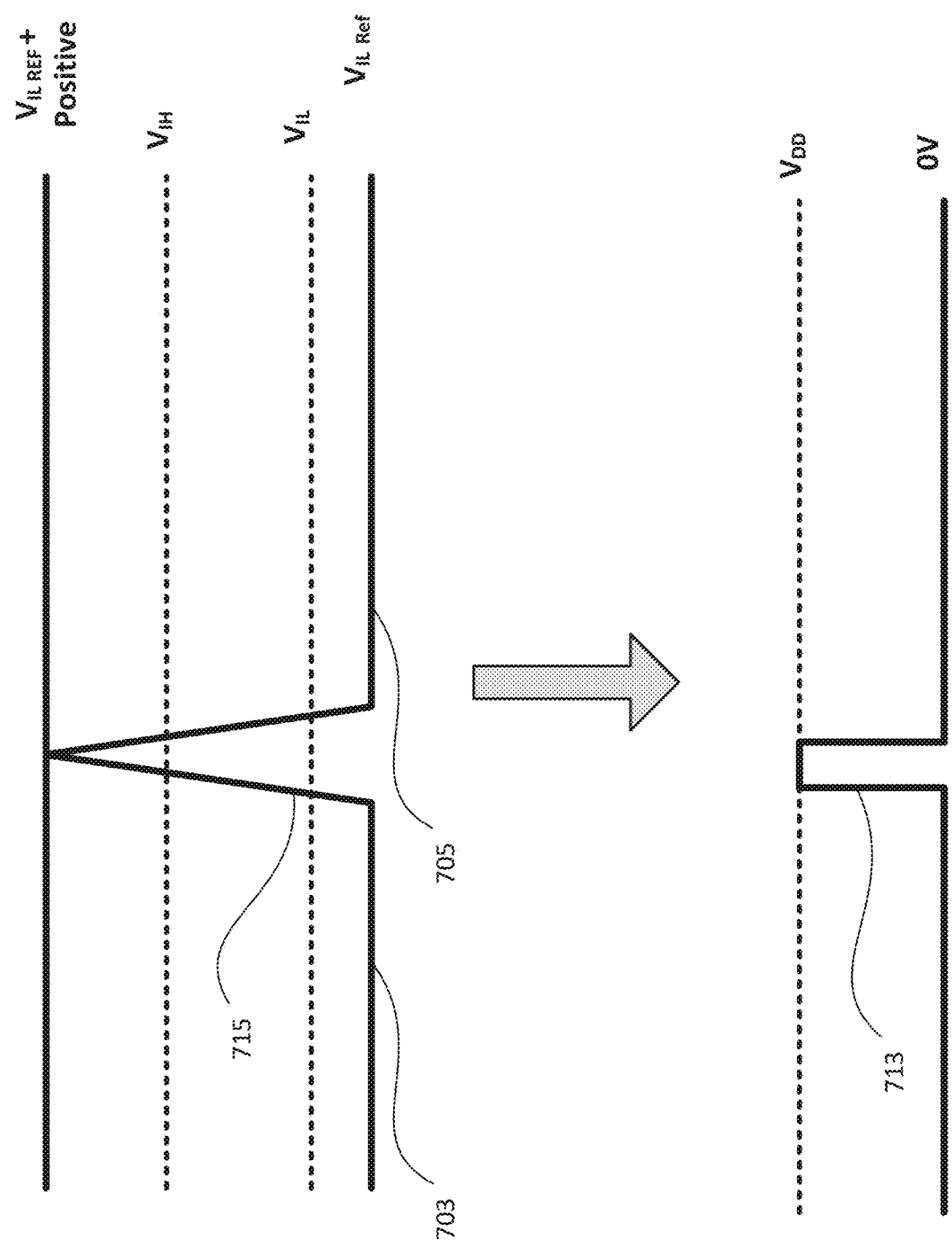
FIG. 7 is an illustration of a positive pulse detection in accordance with aspects of the disclosure.

FIG. 7 illustrates the detection of a positive pulse of a filtered signal by FET 661. In this regard, the FET 661 may have a set high detection voltage, illustrated as line $V_{IH}$, which may be at or around 2.6V, and a set low detection voltage, illustrated as line $V_{IL}$, which may be at or around 1.9V. $V_{IH}$ and $V_{IL}$ may be different values than those listed, and may be dependent upon the type of FETs or transistors used. As shown in FIG. 6, $V_{IL\ Ref}$ is a value below the low detection voltage $V_{IL}$. Before and after a positive pulse, such as positive pulse 405 is input into FET 661, the voltage at the FET 661 may be $V_{IL\ Ref}$, as shown by 703 and 705, respectively. When the positive pulse 405 is input into the FET 661, the voltage input into the FET 661 may be increased above $V_{IL\ Ref}$ eventually reaching a voltage of $V_{IL\ Ref}$ plus the voltage of the positive pulse, illustrated as line $V_{IL\ Ref}$+Positive. The FET 661 may detect the presence of a positive pulse when the voltage passes $V_{IH}$ from $V_{IL\ Ref}$. In some instances, a positive pulse may be detected when the voltage passes $V_{IL}$ from $V_{IL\ Ref}$.

FIG. 8 illustrates the detection of the negative pulse of the filtered signal by FET 662. In this regard, the FET 662 may have a set high detection voltage, illustrated as line $V_{IH}$ and a set low detection voltage, illustrated as line $V_{IL}$. As shown in FIG. 6, $V_{IL\ Ref}$ is a value above the high detection voltage $V_{IH}$. Before and after a negative pulse, such as negative pulse 407 is input into FET 661, the voltage at the FET 662 may be $V_{IH\ Ref}$, as shown by 803 and 805, respectively. When the negative pulse 407 is input into the FET 662, the voltage input into the FET 662 may be decreased below $V_{IH\ Ref}$ eventually reaching a voltage of $V_{IH\ Ref}$ plus the voltage of the negative pulse, illustrated as line $V_{IH\ Ref}$+Negative. The FET 662 may detect the presence of a positive pulse when the voltage passes $V_{IL}$ from $V_{IH\ Ref}$. In some instances, a positive pulse may be detected when the voltage passes $V_{IH}$ from $V_{IH\ Ref}$.

In some instances, the detected pulses may be supplemented with additional voltage, such as 1.8V, 3.3V, 5V, etc., to bring the voltage of the detected pulses to a level that meets requirements for whatever interface the edge detector may be connected to. For instance, the interface (not shown) may be an I2C interface, a universal asynchronous receiver/transmitter (UART), and/or a serial wire debug (SWD) interface. The additional voltage may be supplied by the FETs 661 and 662 and/or voltage sources attached to the FETs, although the additional voltage may be applied after the FETs.

Upon detecting the pulses, the FETs 661 and 662 may output the detected signals to the latch 370, as shown in FIG. 6. The latch 370 may reconstruct the data signal, as shown by square signal 603, for output for further processing by components of the second device 330. Reconstruction of the data signal is illustrated in FIGS. 7 and 8. In this regard, when FET 661 detects a positive pulse, latch 370 may generate a portion of a square wave 713 that has a low voltage of, for example, 0V and a high voltage of $V_{DD}$, as shown in FIG. 7. Similarly, when FET 662 detects a negative pulse, latch 370 may generate a portion of a square wave 813 that has a high voltage of $V_{DD}$ and a low voltage of 0V. The latch 370 may combine the portions of the square wave 713 and 813 to recreate the reconstructed square signal 603 that matches the data signal 401 sent by the transmitter of the first device 310. A D-flip flop may be used to reconstruct the data signal. In this regard, the positive side of the D-flip flop could be the input signal and the negative side could be the reset signal. In another example, a microprocessor may be used to detect rising edge of a positive pulse to generate a high signal and a falling edge of a negative pulse to generate a negative pulse.

While the examples above describe communication from the first device 310 to the second device 330, data may also be transmitted in the opposite direction, from the second device 330 to the first device 310. In this regard, while particular circuitry within the first and second devices 310, 330 was described herein in detail, each device may have the same circuit design, such that two-way communication is possible between the two devices. That is to say, the components of the first device 310 shown in FIG. 3 may be implemented in second device 330 and the components of the second device 330 may be implemented in first device 310.

The technology described herein is advantageous because it allows for the transmission of data over a power line, thereby minimizing the number of device contacts required for communication and power delivery between devices. The reduced number of device contacts provides for efficiency in manufacture, better reliability, and ease of use, as well as reduced cost. The technology described herein further provides the capability for devices to communicate across a power line without the need for modulation and demodulation modules which add complexity and cost to the manufacture of the devices. Further, by not requiring modulation, propagation delays are minimized and the risk for electromagnetic interference produced by high-frequency carriers is reduced.

In addition, the above described technology avoids the need for complex detection mechanisms and communication systems used in time-division multiplexing systems which reduced production costs and complexity. Further, the above described obviates the need for operational amplifiers as comparators to detect signals on a power line, which would reduce data throughput. In this regard, the above described technology may operate with data rates beyond 2 Mbps.

While the examples described above primarily relate to earbuds and a case for the earbuds, it should be understood that the data over power line design may be implemented in any of a number of devices. By way of example only, the first device may be a smartwatch, mobile phone, tablet, speaker, microphone, head-mounted display, fitness tracker, or any of a number of other devices. The second device may be, for example, a case, a charging stand, a mobile computing device, or any other type of device capable of transmitting power to the first device.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system, comprising:
   a first device including a first set of contacts; and
   a second device including a second set of contacts, the second set of contacts adapted to electronically engage with the first set of contacts of the first device to form at least a power and ground lines connection;
   each of the first device and the second device including circuitry for providing data over the power line connection between the first device and the second device, the circuitry comprising:
      a power line;
      a ground line;
      a transmitter line carrying data signals;
      a capacitor coupling the transmitter line to the power line at a connection point, the capacitor configured to filter DC components from the data signals and output a filtered signal that is carried to the power line; and
      a receiver comprising a first field effect transistor and a second field effect transistor, the first and the second field effect transistors configured to detect the filtered signal, the first field effect transistor configured to detect positive pulses of the filtered signal and the second field effect transistor configured to detect negative pulses of the filtered signal.

2. The system of claim 1, wherein the data signals include one or more square waves.

3. The system of claim 2, wherein the filtered signal comprises, for each of the one or more square waves, a positive pulse and a negative pulse.

4. The system of claim 1, wherein the first field effect transistor is connected to the power line via a first reception line and the second field effect transistor is connected to the power line via a second reception line.

5. The system of claim 4, wherein a second capacitor couples the first reception line and the first field effect transistor and a third capacitor couples the second reception line and the second field effect transistor.

6. The system of claim 4, further comprising a low reference voltage source and a high reference voltage source.

7. The system of claim 6, wherein the low reference voltage source is connected to the first reception line and the high reference voltage source is connected to the second reception line.

8. The system of claim 7, wherein the first field effect transistor has a low detection voltage and the first field effect transistor is configured to detect the filtered signal when the voltage of the filtered is at or above the low detection voltage.

9. The system of claim 7, wherein the second field effect transistor has a high detection voltage and the second field effect transistor is configured to detect the filtered signal when the voltage of the filtered is at or below the high detection voltage.

10. The system of claim 1, further comprising a latch for reconstructing the detected filtered signal.

11. The system of claim 1, wherein the first device is a case.

12. The system of claim 1, wherein the second device is an earbud.

13. A receiving device, comprising:
    a power line;
    a receiver comprising:
       a first field effect transistor, the first field effect transistor configured to detect positive pulses of a filtered signal;
       a second field effect transistor, the second field effect transistor configured to detect negative pulses of the filtered signal; and
       a latch;

a first capacitor for coupling the power line to the first field effect transistor, the first capacitor configured to filter DC components from data signals and output the filtered signal; and a second capacitor for coupling the power line to the second field effect transistor, the second capacitor configured to filter DC components from data signals and output the filtered signal, wherein the device is configured to receive power and data from another device over the power line.

14. The receiving device of claim 13, wherein the receiving device is further configured to transmit data over the power line to the other device.

15. The power receiver device of claim 13, further comprising a power source connected to the power line.

16. The receiving device of claim 13, wherein the data signals include one or more square waves.

17. The receiving device of claim 16, wherein the filtered signal comprises, for each of the one or more square waves, a positive pulse and a negative pulse.

18. The receiving device of claim 13, wherein the first field effect transistor is connected to the power line via a first reception line and the second field effect transistor is connected to the power line via a second reception line.

19. The receiving device of claim 18, wherein the second capacitor couples the first reception line and the first field effect transistor and a third capacitor couples the second reception line and the second field effect transistor.

20. The receiving device of claim 18, further comprising a low reference voltage source and a high reference voltage source.

* * * * *